United States Patent [19]

Baer et al.

[11] Patent Number: 4,734,906

[45] Date of Patent: * Mar. 29, 1988

[54] OPTICAL DISK RECORDING AND READOUT SYSTEM HAVING READ, WRITE AND COARSE LIGHT BEAMS

[75] Inventors: James W. Baer, Boulder; Scott D. Wilson, Thornton, both of Colo.

[73] Assignee: Storage Technology Partners 11, Louisville, Colo.

[*] Notice: The portion of the term of this patent subsequent to Apr. 8, 2003 has been disclaimed.

[21] Appl. No.: 628,692

[22] Filed: Jul. 6, 1984

[51] Int. Cl.$^4$ .......................... G11B 7/00; G02B 5/04
[52] U.S. Cl. .................... 363/112; 369/122; 350/286
[58] Field of Search ............ 369/112, 122, 43, 46; 350/286

[56] References Cited

U.S. PATENT DOCUMENTS

| | | | |
|---|---|---|---|
| T. 953,002 | 12/1976 | Firester | 178/66 R |
| 3,871,750 | 3/1975 | Mecklenborg | 350/286 |
| 3,973,317 | 9/1976 | Glorioso | 178/6.6 R |
| 4,085,423 | 4/1978 | Tsunoda et al. | 358/128 |
| 4,115,809 | 9/1978 | Uenu | 358/128 |
| 4,128,308 | 12/1978 | McNaney | 350/286 |
| 4,179,708 | 12/1979 | Sheng et al. | 369/112 |
| 4,198,701 | 4/1980 | Reddersen et al. | 365/127 |
| 4,214,817 | 7/1980 | McNaney | 350/286 |
| 4,272,651 | 6/1981 | Yoshida et al. | 369/112 |
| 4,321,839 | 3/1982 | Yamashita et al. | 369/122 |
| 4,333,173 | 6/1982 | Yonezawa et al. | 369/45 |
| 4,337,535 | 6/1982 | Van Megen | 369/121 |
| 4,397,527 | 8/1983 | Geyer | 369/112 X |
| 4,411,500 | 10/1983 | Yonezawa et al. | 369/112 X |
| 4,449,215 | 5/1984 | Reno | 369/112 X |
| 4,520,472 | 5/1985 | Reno | 369/112 |
| 4,542,492 | 9/1985 | Leterme et al. | 369/112 X |
| 4,580,879 | 4/1986 | Wilson | 350/421 |

OTHER PUBLICATIONS

Hammer, "In-line Anamorphic Beam Expanders", Aug. 1, 1982; vol. 21, No. 15, Applied Optics, p. 2861.

*Primary Examiner*—Aristotelis M. Psitos
*Attorney, Agent, or Firm*—Woodcock Washburn Kurtz Mackiewicz & Norris

[57] ABSTRACT

A self contained, replaceable diode laser module for providing a fully collimated, de-astigmatized, and circular cross-sectioned beam. In the preferred embodiment a first compound spherical lens partially collimates the beam. An in-line combined cross-section modifier system then de-astigmatizes and modifies the cross-section of the beam. The beam modifier system is comprised of first and second triangular prisms oriented at non-normal angles to the path of the beam. This allows both the cross-section and the astigmatism of the beam to be corrected. A planar mirror between the first and second prisms directs the beam from the first prism to the second prism, so that the beam can exit the second prism co-axial with the incident beam path. The beam then enters the second collimating subsystem. This subsystem is a telescopic lens system comprised of a second and a third spherical, which simultaneously, completely collimates the beam, and expands the beam to the proper diameter for transmission through the optical system of the main device. The beam, upon existing the second collimating subsystem is a fully collimated beam, which is de-astigmatized and has a circular cross-section of the proper diameter.

4 Claims, 5 Drawing Figures

OPTICAL DISK RECORDING AND READOUT SYSTEM HAVING READ, WRITE AND COARSE LIGHT BEAMS

BACKGROUND OF THE INVENTION

The disclosed invention relates to the field of the optical storage of digital data, and in particular, to the use of diode lasers to read or write data in an information storage and retrieval device.

In high speed random access optical recording systems, it is well known to use a modulated and focused radiation beam, usually a laser, to record both digital and analog information on a recording surface. See e.g., U.S. Pat. No. 3,314,073, issued to Becker on Apr. 11, 1967, wherein a modulated laser beam is focused on to a light sensitive media. Since all optical recording systems which make use a focused coherent light beams operate using the same physical principals, most optical recording systems also have certain basic elements in common. For example, all systems must have a means for focusing the incident read beam on the disk surface, some means for tracking the read beam over the disk surface, and a means of detecting the data recorded on the disk surface, whether reflected by the surface toward a detector system or transmitted through the system to a detector, see e.g., U.S. Pat. No. 3,991,275, issued Nov. 9, 1976, to Buithius.

In recent years, there has been increased interest in the development of optical storage devices which can record as well as read optical information. See e.g. U.S. Pat. No. 4,363,116, issued Dec. 7, 1982, to Kleuters et al., wherein a single laser is used to both record data on, and to read data from, the disk surface. In Kleuters, this dual purpose is accomplished by switching the laser from a higher intensity write beam to a lower intensity read beam. There has also been increased interest in the use of multi-laser systems for both reading and writing. See U.S. Pat. No. 4,198,701, issued Apr. 15, 1980, to Reddersen et al., wherein a first beam is used for writing data, and a second beam is used for reading data. See also U.S. Pat. No. 4,334,299, issued June 8, 1982, to Komurasaki et al.

In the early optical recording devices, gas lasers were used to read and write data. In recent years, the power output of semiconductor lasers has increased and sustained performance has become more reliable. See U.S. Pat. No. 4,360,920, issued Nov. 23, 1982 to Woda et al.; and U.S. Pat. No. 4,360,919, issued Nov. 23, 1982, to Fijiwara et al. As a result, diode lasers has begun to be used in optical recording devices to read and, more recently, to write user data. See for example U.S. Pat. No. 4,345,321, issued Aug. 17, 1982 to Arquie et al.

However, the performance characteristics of diode lasers still vary widely from individual laser to individual laser. Accordingly, where standardized output for reading or writing is required, it has been necessary to custom design the optics in the device according to the specific output characteristics of the individual laser diode mounted in the device. See U.S. Pat. No. 4,322,838, issued Mar. 30, 1982, to Neumann, disclosing a collimating system; U.S. Pat. No. 4,333,173, issued to Yonezawa et al., and; U.S. Pat. No. 4,128,308, issued Dec. 5, 1978 to McNaney. Thereafter, should that laser need to be replaced, the optical elements which compensated for the output characteristics of that diode would also need to be changed or adjusted. It is difficult and expensive to make such matching changes and adjustments in a field location in order to bring the output of the new diode laser into specification. Even if the replacement laser characteristics are known and the appropriate optical elements on hand, the alignment of the element relative to the laser requires extremely precise testing procedures and equipment.

The disclosed invention addresses this problem by providing a field replaceable laser diode module having customized and precisely aligned elements mounted thereon to produce standardized laser output. The module can easily and efficiently be replaced in a field maintenance environment and a defective laser can be replaced in the field without undue or expensive adjustments. Additionally, closer tolerances can be maintained by adjusting the modules during manufacture at the factory where permanent manufacturing and testing facilities can be utilized.

It is an object of this invention to provide a diode laser module which is field replaceable.

It is another object of the disclosed invention to provide a diode laser module which is pre-tuned to standard, reproducible specifications.

It is yet another object of the disclosed invention to provide a diode laser unit which can be easily replaced in a field location.

BRIEF SUMMARY OF THE INVENTION

The present invention discloses a self contained, replaceable diode laser module which produces standardized output from diode laser light sources have widely varying output characteristics. The light beam emitted by the diode laser is usually a divergent, astigmatic beam, having an elliptical cross-section. Also, the power outputs usually varies from laser to laser. For the beam to be properly used in an optical read/write device wherein diffraction limited spot sizes are desirable, the beam must be collimated, de-astigmatized, and the beam profile corrected to a circular cross-section.

The disclosed invention, a diode laser module, is comprised of: a base plate; a semi-conductor laser; a beam collecting and collimating lens system; a beam cross-section correcting lens system; a beam de-astigmatizing system, and; a beam cross-section expanding lens system. The laser and all of the optical elements of the various lens systems are adjustably attached to the base plate.

In operation of the preferred embodiment, the beam emitted by the diode laser is incident upon the first portion of the collimating lens system, hereinafter called the first collimating subsystem. In the preferred embodiment the first collimating subsystem is a first compound spherical lens. This first compound spherical lens collects and partially collimates the beam.

The beam then enters the beam cross-section correcting lens system. The cross-section correcting lens system is comprised of a first triangular shaped prism, a planar reflecting mirror, and a second triangular shaped prism. The first and second prisms are oriented such that the beam is incident upon the entrance surfaces of the first and second prisms at non-thermal angles. By entering the prism at a non-normal angle, the minor axis of the beam is expanded. However, the major axis remains unchanged, thus changing the cross section profile of the beam. The first and second prisms are selected and oriented relative to the axis of the beam and each other such that upon exiting the second prism, the beam is completely circularized.

In this preferred embodiment, the cross-section correction lens system is also advantageously used to de-astigmatize the beam. When a slightly uncollimated coherent light beam enters a planar refractive surface at a non-normal angle, astigmatism is introduced into the beam. By properly selecting and positioning the prism and adjusting the collimating lens, the astigmatizing characteristic of the prisms is used to "correct" or de-astigmatize the astigmatic beam produced by the diode laser. The beam thereafter enters the second portion of the collimating lens system hereinafter called the second collimating subsystem. The second collimating subsystem is comprised of a second and a third spherical lens. Thus, a de-astigmatized but non-collimated beam exits the prisms and enters the second collimating subsystem where the beam can then be fully collimated. It can thus be seen in the preferred embodiment why the collimation system is split into two separate portions. The beam must be slightly uncollimated as it passes through the prisms in order to take advantage of the astigmatism correcting features of the prisms.

In the preferred embodiment, the second and third lens also act to expand the beam to the diameter specified for use in the remainder of the device's optical system.

DETAILED DESCRIPTION OF THE PREFERRED EMBODIMENT

Figure 1:
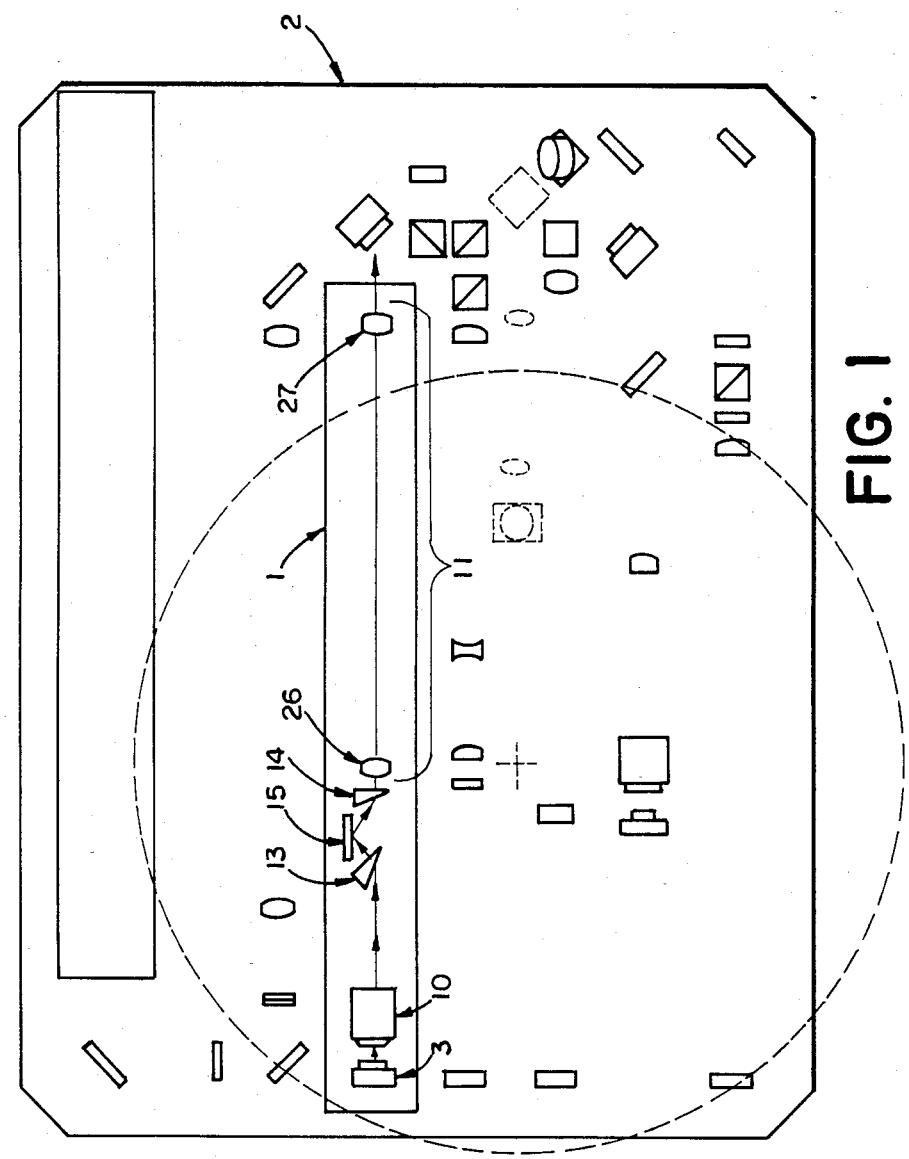
FIG. 1 is a top view pictorial drawing showing the diode laser module as a component in a read/write optical recording device, the module used as the write laser component.

As shown in FIG. 1, the disclosed invention, a self-contained replaceable laser module 1 for reforming the beam emitted by a diode laser, is configured as the write laser module in an optical disk read/write storage device 2. For detailed understanding of the read/write device 2 for which the module 1 is contemplated for use, see the description in co-pending Patent Application Ser. No. 628,196, entitled OPTICAL DISK RECORDING APPARATUS HAVING COMBINED COARSE SEEK, READ AND WRITE BEAM OPTICS, Filed July 6, 1984, which is hereby incorporated by reference.

In any device using lasers for reading or writing data, standardized output from the laser light source is necessary. However, the semiconductor diode lasers presently manufactured vary widely in output characteristics. That is, two diode lasers manufactured by the same entity using the same procedures will have slightly different cross-section shapes, varying degrees of divergence (un-collimation), and varying amounts of astigmatism. When using diode lasers, the output characteristics of the individual laser are determined and various optical elements used to standardize the output of that diode laser.

The disclosed invention is a module 1 which contains all of the optical elements necessary to reform and correct the output characteristics of the laser diode combined into a single unit, so that the output of each module 1 that is introduced into the optical system of the main device 2 has standardized output. The entire write laser module 1 is replaced as a unit, vastly simplifying the maintenance, alignment and calibration procedures. At the factory, the optical elements can be removed and used in a new module 1.

Figure 2:
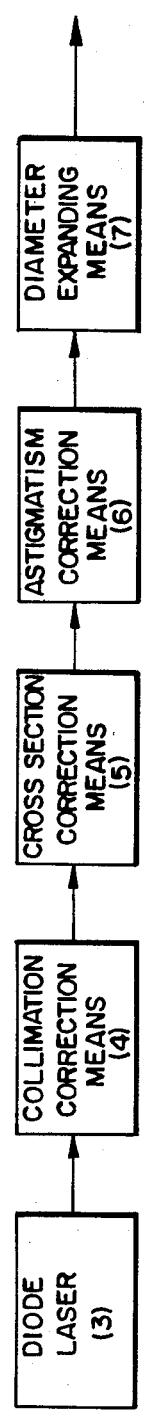
FIG. 2 is a schematic drawing showing the functional optical elements of the disclosed invention.

As shown in FIG. 2, the functional elements of the diode laser module 1 are comprised of: a diode laser light source 3, emitting a coherent, divergent, astigmatic, elliptical cross-section light beam; a collimation means 4 for collimating the light beam emitted from the diode laser; a cross-section correcting means 5 for expanding the minor or the major axis of the incident beam in order to circularize the cross-section of the beam; a means 6 for correcting the astigmatism of the beam emitted from the diode laser 3, and; a diameter expanding means 7 for expanding the beam diameter. In the preferred embodiment, some functional elements are comprised of separate optical subsystems, while other optical systems perform more than one function.

Figure 3:
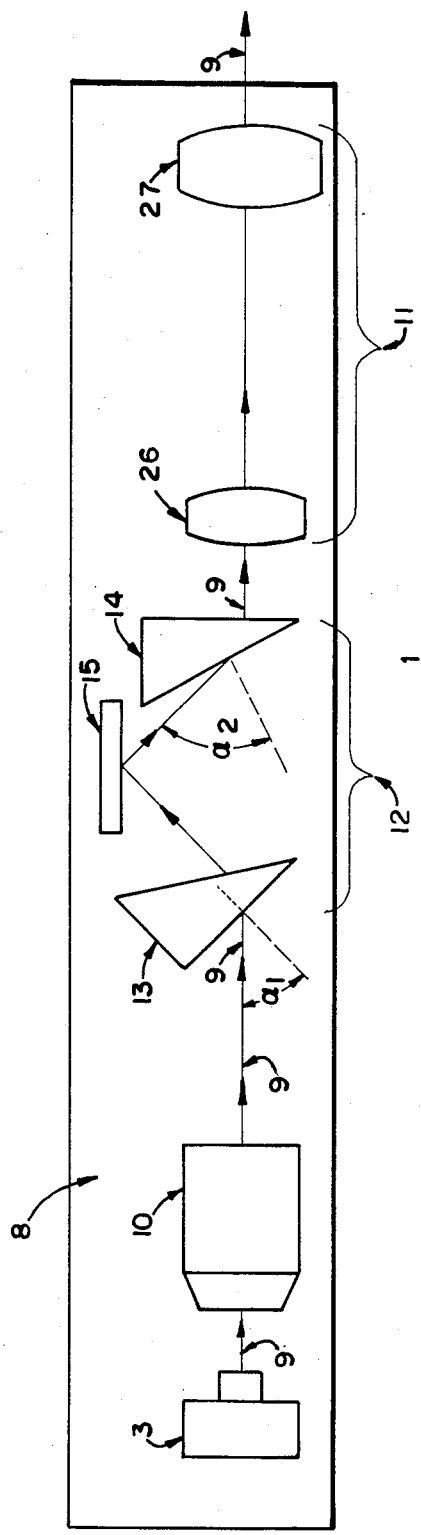
FIG. 3 is a top view pictorial drawing of the preferred embodiment of the diode laser module shown as a field replaceable unit.

As shown in FIGS. 1 and 3, the diode layer 3 is fixed to the base plate 8. In this preferred embodiment, the collimating means 4 is divided into a first and a second collimating subsystem 10 and 11. The beam 9 emitted by the diode laser 3 passes through the first collimating subsystem 10. In the preferred embodiment the first collimating subsystem 10 a compound spherical lens 11 is used. The first collimating subsystem 10 partially collimates the laser beam 9, and also serves to collect the light in beam 9 emitted by the laser diode 3. As will be discussed below, for efficient operation of the preferred embodiment, the first collimating subsystem 10 is designed to only partially collimate the beam 9.

After passing through the collimating subsystem 10, the beam 9 is incident upon the prism beam modifier system 12. In the preferred embodiment, this prism beam modifier system 12 is comprised of a first triangular prism 13, a second triangular prism 14, and a planar mirror 15. The prism beam modifier system 12 serves two purposes. The first is to circularize the cross-section of the elliptically-shaped beam 9. The second purpose is to de-astigmatize the beam 9.

Figure 4:
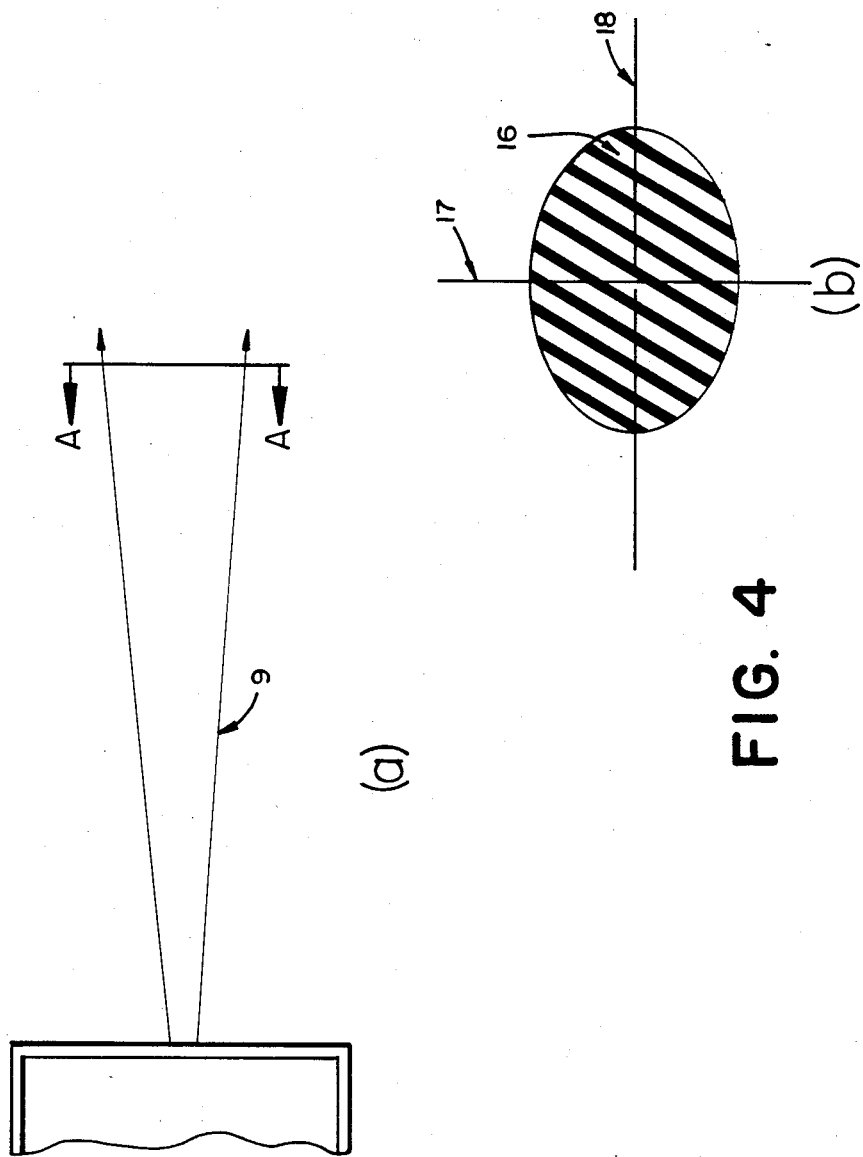
FIG. 4a is a representational view of the end fact of the diode laser, showing a side view of the diverging laser beam.
FIG. 4b is a cross-section A—A view of the laser beam shown in FIG. 4a, showing the elliptical cross-section shape of the emitted diode laser beam.

As shown in FIG. 4a, the diode laser 3 emits a beam 9 which, though coherent, is diverging, and as shown in FIG. 4b, has an elliptical cross-section 16. When an uncollimated light beam is incident on a planar surface at a non-normal angle, its minor axis 17 is expanded, while its major axis 18 remains unchanged. Accordingly, the first and the second triangular shaped prisms 13 and 14 are oriented such that the partially collimated beam 9 impinges the prism surfaces at non-normal angles. In order to provide for an in-line expansion system, each prism 13 and 14 provides approximately one-half of the circularization needed, with the planar mirror 15 placed between the first and the second prism 13 and 14 in order to reflect the beam 9 emerging from the first prism 13 onto the second prism 14. Upon emerging from the second prism 14, the incident beam 9 has a circular cross-section. For more information regarding in-line expansion, see co-pending U.S. Patent Application Ser. No. 529,425, filed Sept. 6, 1983, entitled "IN- LINE ANAMORPHIC BEAM EXPANDER", now U.S. Pat. No. 4,580,879 which is hereby incorporated by reference.

Figure 5:
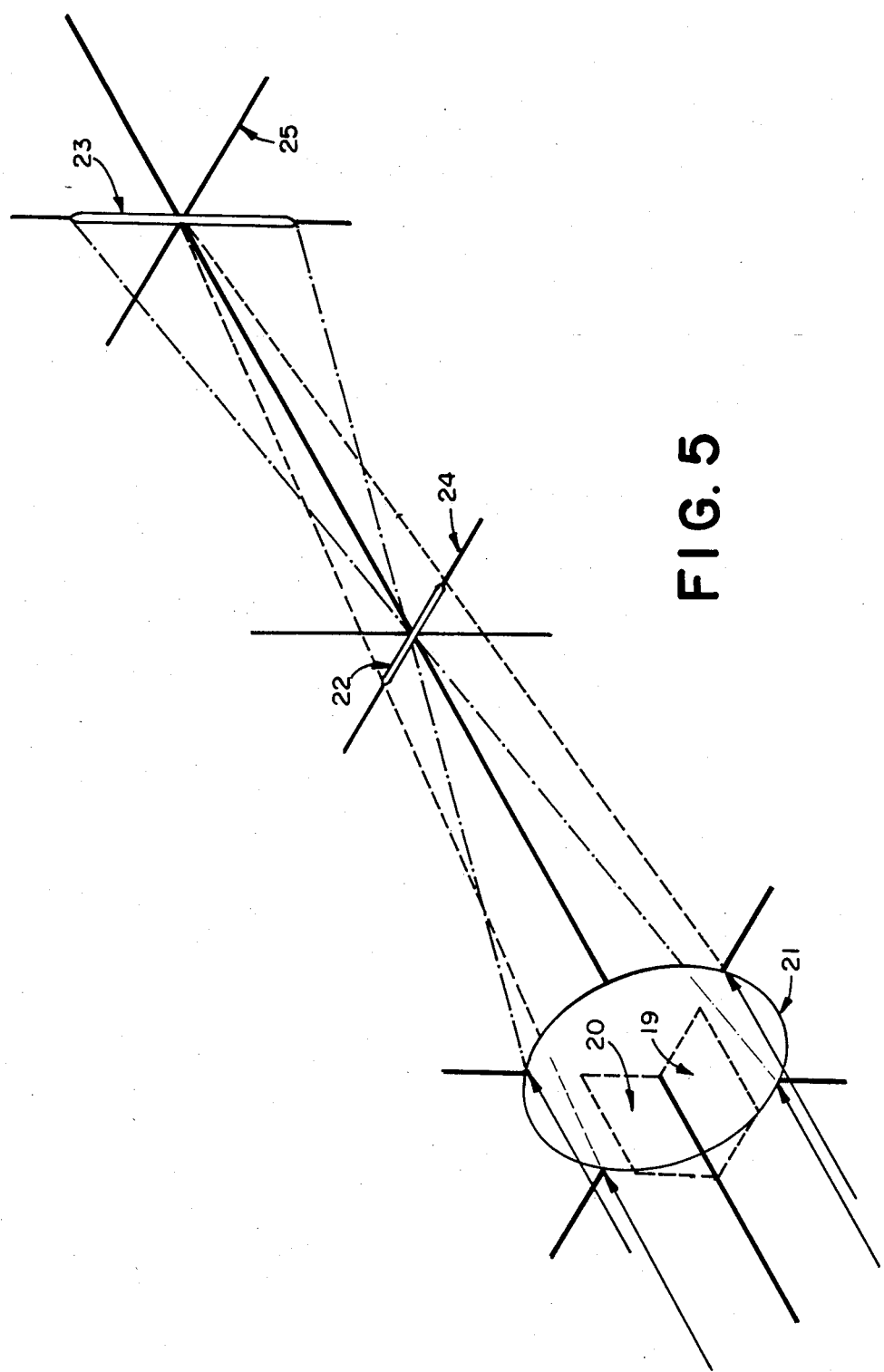
FIG. 5 is a perspective representation showing the astigmatism of the beam generated by the diode laser.

The incident beam 9 is also astigmatic, i.e., has two distinct focal points. As shown in FIG. 5, the first plane 19 and second plane 20 of example lens 21 provide a primary 22 and a secondary 23 image resulting in a line focus at the first 24 and the second 25 focal planes.

When an un-collimated beam passes through a planar surface at a non-normal angle, the effective focal point of one axis of the beam is shifted creating an astigmatic beam. Generally, astigmatism so introduced has been viewed as a problem. However, the preferred embodiment advantageously makes use of this characteristic to correct the original astigmatism of the incident beam 9. Accordingly, by proper selection of the prism 13 and 14 shapes and their respective angles of orientation, the astigmatism in the incident beam 9 can be corrected. In a device where the path of the beam 9 after exit from the prism is not critical, a single prism (not shown) may be used. However, in the preferred embodiment, the two prisms 13 and 14, each partially correcting the astigmatism of the beam 9, and are used in conjunction with the planar mirror 15 to provide for the in-line de-astigmatization of the beam 9.

Upon emerging from the prism beam modifier system 12, the now circularized and de-astigmatized beam 9 must be fully collimated. The second collimating subsystem 11 of the collimating means 4 does this. In the preferred embodiment, the second collimating subsystem 11 is comprised of a second and a third spherical lens 26 and 27. This system 11 also operates as the beam expanding (telescopic) lens system 7, to expand the now circular beam 9 diameter to that necessary for use in the main device 2 optical system. Therefore, a completely collimated, circularized beam 9 exits the module 1 from the third spherical lens 27.

The advantage of this module 1 is that in a field repair situation, should the diode laser 3 fail, the entire module 1 can be removed and replaced with a new module 1. All that is required is alignment of the module 1 with the optical elements in the main device 2. It is not necessary to customize each of the optical elements necessary to standardize the output of the replacement laser diode 3.

We claim:

1. A self-contained, replaceable laser module for use in an optical information storage and retrieval device, said module presenting a reformed laser beam for using in reading or writing data in the optical information storage and retrieval device, said laser module comprised of:
    a base plate;
    a diode laser, said laser emitting a divergent, astigmatic, non-circular cross-sectioned light beam, said laser being fixedly attached to the base plate;
    means for collimating the light beam emitted by the diode laser, said collimating means being fixedly attached to the base plate in a position to receive the beam emitted by the diode laser;
    means for correcting the astigmatism of the light beam emitted by the diode laser, said means being fixed and positioned on the base plate to correct the astigmatism in the specific diode laser attached to the base plate, and;
    means for expanding the major or minor axis of the incident beam so as to circularize the cross-section of the beam, said means being positioned on the base plate so as to induce an in-line expansion of the beam and thereby correct the crosssection of the individual diode laser attached to the base plate, said means comprising an in-line prism beam modifier system comprised of a first prism positioned and oriented to receive the incident elliptical cross-sectioned beam and partially circularize said beam, a second prism positioned and oriented to receive the partially circularized beam from the first prism and fully circularize the beam, and a planar mirror positioned between the first and the second prism so as to receive the beam exiting from the first prism and reflect the beam into the second prism, the configuration and position of the prisms oriented such that the path of the beam upon exiting the second prism is coaxial with the path of the beam incident upon the first prism;
    wherein the prism beam modifier system further comprises said means for correcting the astigmatism of the incident beam, such that upon the beam passing through said first and second prisms at a non-normal angle, an astigmatism is introduced into the beam by said first and second prism which corrects the astigmatism of the beam emitted by the diode laser.

2. A laser module as recited in claim 1, wherein the means for collimating the light beam emitted by the diode laser is comprised of:
    a first collimating subsystem, said first collimating subsystem collecting the diode laser light beam incident thereto, and partially collimating the same prior to its being incident upon said means for circularizing, and;
    a second collimating subsystem, said second collimating subsystem receiving the partially collimated and circularized laser beam and completely collimating the laser beam.

3. A laser module as recited in claim 2, wherein the first collimating subsystem is comprised of a first compound spherical lens.

4. A laser module as recited in claim 3, wherein the second collimating subsystem is comprised of:
    a second spherical lens, and;
    a third spherical lens, the second spherical lens positioned to receive the beam from the first spherical lens.

* * * * *